US012714893B2

(12) United States Patent
Thiers et al.

(10) Patent No.: US 12,714,893 B2
(45) Date of Patent: Aug. 25, 2026

(54) DEVICE FOR JETTISONING FLUID IN A DETERMINED DIRECTION FOR A FIREFIGHTING HOST AIRCRAFT AND AIRCRAFT EQUIPPED WITH SUCH A DEVICE

(71) Applicant: Airbus SAS, Blagnac (FR)

(72) Inventors: Jean-Loup Thiers, Toulouse (FR); Samuel Burgunder, Blagnac (FR)

(73) Assignee: Airbus SAS, Blagnac (FR)

(*) Notice: Subject to any disclaimer, the term of this patent is extended or adjusted under 35 U.S.C. 154(b) by 242 days.

(21) Appl. No.: 18/452,174

(22) Filed: Aug. 18, 2023

(65) Prior Publication Data

US 2024/0066336 A1 Feb. 29, 2024

(30) Foreign Application Priority Data

Aug. 30, 2022 (FR) ...................................... 2208682

(51) Int. Cl.
*A62C 3/02* (2006.01)
*B64D 1/16* (2006.01)

(52) U.S. Cl.
CPC .............. *A62C 3/0242* (2013.01); *B64D 1/16* (2013.01)

(58) Field of Classification Search
CPC ....... A62C 3/0242; A62C 3/0229; A62C 3/08; B64D 1/16; B64D 1/18; B64D 7/06; B05B 13/005; B05B 1/169; F16L 9/22; F16L 11/042; F16L 11/122; F16L 11/18; F16L 23/10; F16L 27/023; F16L 51/029; F16L 51/025
See application file for complete search history.

(56) References Cited

U.S. PATENT DOCUMENTS 3,698,480 A 10/1972 Newton
3,901,467 A 8/1975 Hawkshaw
4,195,693 A * 4/1980 Busch ................. A62C 3/0228 169/53

(Continued)

FOREIGN PATENT DOCUMENTS

CN 1651152 A * 8/2005 ........... B05B 1/1609
EP 1053935 A1 11/2000
WO 2004108528 A2 12/2004

OTHER PUBLICATIONS

French Search Report and Written Opinion for corresponding French Patent Application No. 2208682 dated Mar. 10, 2023.

*Primary Examiner* — Gerald L Sung
*Assistant Examiner* — Jingchen Liu
(74) *Attorney, Agent, or Firm* — Greer, Burns & Crain, Ltd.

(57) ABSTRACT

A fluid storing and jettisoning systems with which host aircraft for fighting fires are to be equipped and which makes it possible to limit the dispersion of water in the air. The aircraft fluid storing and jettisoning system comprises a fluid reservoir and at least one tube comprising a closed tank having at least one opening intended to be connected in leak-tight fashion respectively to said one or more tubes for the entry of fluid and at least one opening oriented so as to make it possible to jettison the fluid in a determined direction that is different from the longitudinal direction of flow of the fluid in the one or more tubes. Also an aircraft equipped with such a system.

6 Claims, 5 Drawing Sheets

(56) References Cited

U.S. PATENT DOCUMENTS 7,303,168 B1 * 12/2007 Lazes .......................... B64D 1/16 244/136
7,748,662 B2 * 7/2010 Hale .......................... B64D 1/16 169/53
2002/0109023 A1 * 8/2002 Thomas .................. E03C 1/025 239/588
2006/0260826 A1 11/2006 Hutter et al.
2014/0367128 A1 * 12/2014 Parker ...................... B64D 1/16 169/53
2016/0016817 A1 * 1/2016 Chau .......................... B05B 1/18 210/275
2021/0107650 A1 * 4/2021 Bandak ................ A62C 3/0242

* cited by examiner

DEVICE FOR JETTISONING FLUID IN A DETERMINED DIRECTION FOR A FIREFIGHTING HOST AIRCRAFT AND AIRCRAFT EQUIPPED WITH SUCH A DEVICE

CROSS-REFERENCES TO RELATED APPLICATIONS

This application claims the benefit of French Patent Application Number 2208682 filed on Aug. 30, 2022, the entire disclosure of which is incorporated herein by way of reference.

FIELD OF THE INVENTION

The present invention relates to a system for storing and jettisoning fluid, and more particularly water or products such as a retardant, integrated in a host aircraft for converting it into a water-bombing aircraft used to fight fires, notably forest fires. The invention applies to all types of aircraft that can be used to receive such a system, and notably to civil and military aircraft.

BACKGROUND OF THE INVENTION

To make it possible to fight forest fires more effectively, a water-bombing aircraft backup would be useful. It is therefore envisaged to temporarily convert aircraft that are not in use when the fire is raging, or aircraft the use of which can be delayed or cancelled, into water-bombing airplanes. Such aircraft are referred to as host aircraft. When the fire stops, the aircraft can be reassigned to its primary mission. Thus, for example, military airplanes such as A400M (registered trademark) are particularly suitable in peacetime. This type of airplane of cargo type has an interior volume capable of carrying a load comprising a water tank and a device for jettisoning the water out of the aircraft in a direction longitudinal to the aircraft, causing the sprayed water to be broadly dispersed. When the fire is extinguished, the aircraft just needs to be unloaded to be used as military airplane again.

SUMMARY OF THE INVENTION

The present invention aims to propose an improvement to the water storing and jettisoning systems in order to limit the dispersion of water in the air.

To that end, the present invention relates to a fluid storing and jettisoning system comprising a fluid tank and at least one tube, characterized in that it comprises, at the end of the one or more tubes, a jettisoning device comprising a closed tank having at least one opening intended to be connected in leak-tight fashion respectively to said one or more tubes for the entry of fluid and multiple independent and contiguous openings which are circumscribed in a single opening with a given geometric shape and are oriented so as to make it possible to jettison the fluid in a determined direction which is different from the longitudinal direction of flow of the fluid in the one or more tubes.

In this way, the fluid flows towards the ground and is not dispersed as in the prior art.

The invention provides at least one of the following optional features, taken individually or in combination.

The device is retractable.

A hinge is provided that allows the jettisoning device to pivot in rotation about a transverse axis A.

A second hinge is provided at the tubes to allow a segment of tubes that adjoins the jettisoning device to pivot in rotation about a transverse axis B.

The direction in which the fluid is jettisoned in the one or more openings is in a plane transverse to the tubes, specifically a plane parallel to the plane YZ.

The direction in which the fluid is jettisoned in the one or more openings is vertical and perpendicular to the direction of longitudinal flow of the fluid in the one or more tubes.

The tank comprises multiple independent and contiguous openings circumscribed in one and the same rectangle.

Each opening is shut off by at least one valve.

The possible opening/closing of some or all of the valves makes it possible to adjust the flow rate of the jettisoned fluid.

The valves take the form of flaps which, in the closed position, are mounted end to end without superposing one another in order to close the opening and are parallel to one another in the open position.

The opening and the closing of the valves are controlled independently by a control device.

The tank has the form of a funnel, specifically having a cross section in a plane parallel to the horizontal plane XY that narrows vertically downwards.

The present invention also relates to the fluid storing and jettisoning system comprising a fluid reservoir and at least one tube, characterized in that it comprises, at the end of the one or more tubes, a jettisoning device having one or more of the features mentioned above.

The present invention also relates to the host aircraft comprising a rear door which can be moved between a closed position and an open position for communication between the outside and an internal area in which a system having the features mentioned above is introduced, the one or more openings of the fluid jettisoning device projecting completely beyond the rear door of the aircraft in the jettisoning position.

BRIEF DESCRIPTION OF THE DRAWINGS

Other aims, features and advantages will become apparent from the following description of the invention, which is given solely by way of nonlimiting example with reference to the accompanying drawings, in which.

DETAILED DESCRIPTION OF THE PREFERRED EMBODIMENTS

The following description refers to an orthonormal frame of reference X, Y, Z (visible in FIGS. 1 and 2) in which the horizontal directions X, Y and vertical direction Z are defined with reference to an aircraft standing on horizontal ground. The three directions X, Y, Z are mutually orthogonal. The fuselage of the aircraft extends along a longitudinal direction X. The direction Y corresponds to the direction oriented transversely and horizontally with respect to the longitudinal direction X. The direction Z corresponds to the vertical direction or height. As a qualifier for longitudinal and transverse, respectively, vertical means orthogonal to the longitudinal or transverse vertical direction, respectively.

Figure 1:
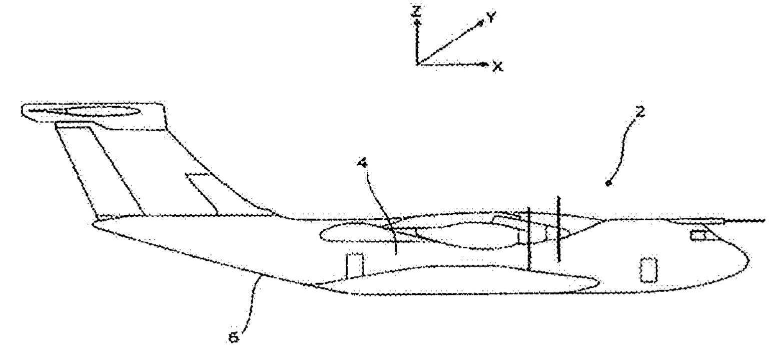
FIG. 1 is a side view of a host aircraft according to the present invention.

FIG. 1 shows a military aircraft 2 of the A400M (registered trademark) type that is intended to be temporarily converted into a water-bombing aircraft. The aircraft 2 comprises an area 4 providing a useful interior free space. It also has a rear door 6 that is capable of being opened during flight. FIG. 1 shows the door 6 in a closed position. The A400M is taken as illustration but other aircraft exhibiting similar features, specifically an area 4 having an interior volume which is sufficient for receiving a modular system 8 as described below and a rear door 6 for communication between the area 4 and the outside of the aircraft, could be used as host aircraft.

According to the present invention, the modular fluid storing and jettisoning system 8 comprises a tank 10, disposed longitudinally, for fluid, in the example illustrated water, retardant or any other fluid used to fight fires, and at least one tube 12 extending longitudinally from the tank to which it is connected. To be disposed or extend longitudinally means that the direction of the largest dimension is parallel to the longitudinal direction, specifically the direction X. The fluid used is generally water but other types of fluid, such as a retardant, could be used in accordance with the fire that is to be extinguished, or even water combined with any product types. The height Hr of the tank, specifically the largest dimension of the tank in the vertical direction Z, is greater than that Ht (largest dimension in the vertical direction Z) of the one or more tubes 12. The height Ht corresponds to the diameter of cylindrical tubes of circular cross section like those shown in the figures. According to the embodiment illustrated, the height Hr is at least twice the height Ht. Furthermore, the width Lr of the tank, specifically the largest dimension in the transverse direction Y, is greater than the largest width of the tube 12 or, in the case of multiple tubes, to the sum of the largest widths of the tubes 12: the width of a tube corresponds to its diameter for cylindrical tubes of circular cross section like those shown in the figures. Because the tube cross section is much smaller than the cross section of the tank, the flow rate of the fluid flowing in the one or more tubes 12 from the tank is all the greater. These dimension ratios determine the flow rate and are therefore chosen so as to have a flow rate that is enough for effective jettisoning of water out of the aircraft. Any other proportions within the dimensions are possible. In the case of multiple tubes 12, they may be disposed parallel to one another. In the case of cylindrical tubes of circular cross section, all of the axes of the tubes are in one and the same plane. In the embodiment illustrated, two tubes 12 are provided but, as seen above, any other number of tubes is conceivable. The two tubes have a cylindrical shape of circular cross section They are parallel and their axes are in one and the same plane parallel to the plane XY. The tubes extend in the longitudinal direction of the tank, specifically in the direction of its length for a parallelepipedal tank with a rectangular base and a square cross section, the tank itself extending in a longitudinal direction. Any other embodiment is possible, specifically tubes of different dimensions, positioned in different planes, etc. The one or more tubes extend such that, once the system 8 is installed in the aircraft, the one or more tubes 12 conduct the fluid to the longitudinal end 20 of the rear door 6 of the aircraft in an open position.

Figure 4:
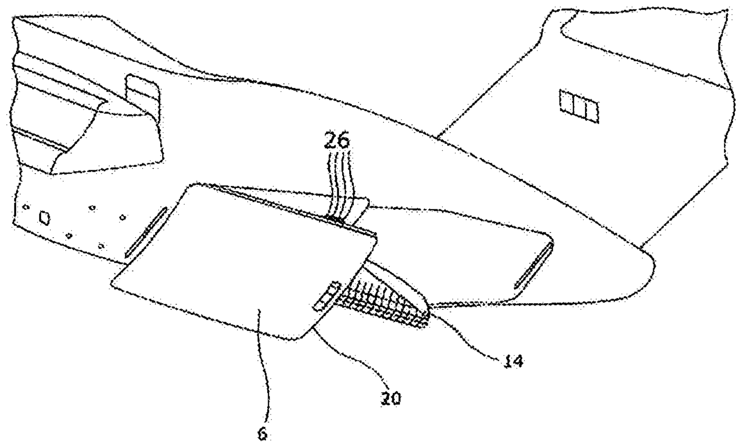
FIG. 4 is a perspective view of the rear area of a host aircraft during operation, fitted with a fluid storing and jettisoning system according to the present invention.
Figure 5:
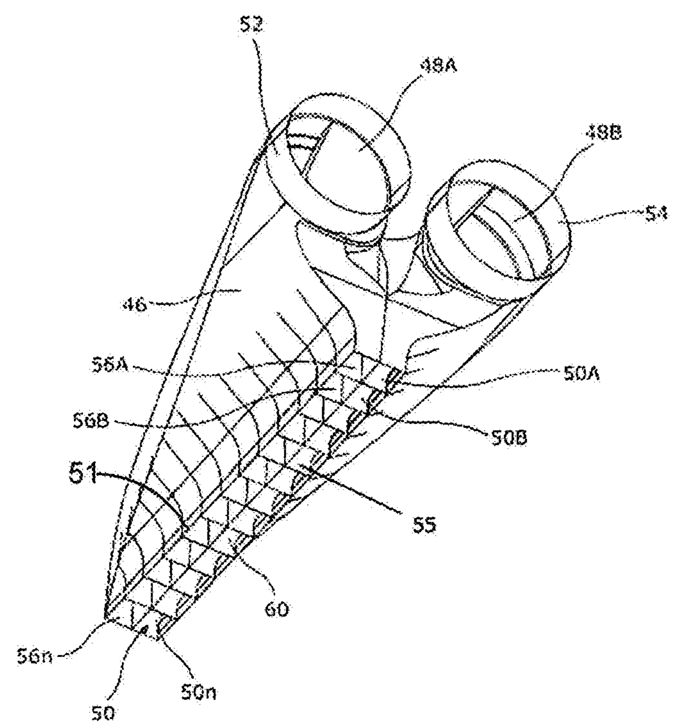
FIG. 5 is a perspective view from a certain angle from below of a fluid storing and jettisoning system according to the present invention.
Figure 6:
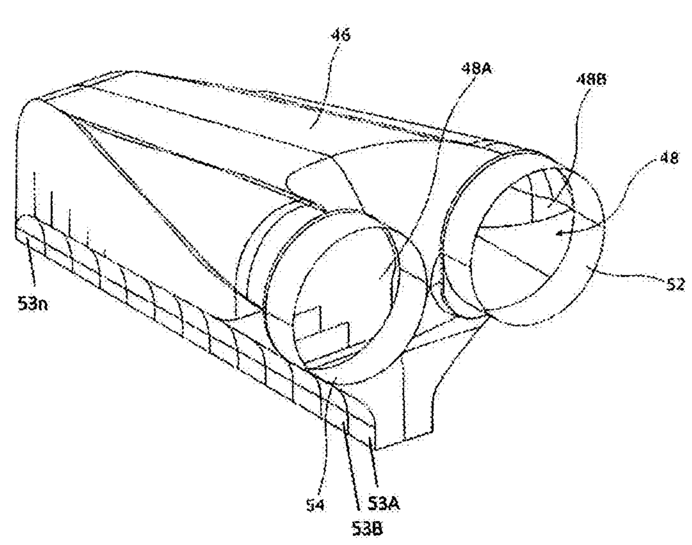
FIG. 6 is a perspective view from a certain angle from above of a fluid storing and jettisoning system according to the present invention.

The tubes 12 extend from the tank to a water jettisoning device 14: their length is chosen so that one of the ends 16 of the tubes is connected to the tank 10 and the other end 18 to the device 14. In the embodiment, once the system 8 is in a jettisoning position, the end 18 of the tubes is in line with the free end 20 (shown in FIG. 4) of the rear door 6. In this way, the jettisoning device 14 is completely outside the aircraft in overhanging fashion. The length of the tubes 12 also makes it possible to position the tank 10 at an acceptable distance from the center of gravity of the aircraft so as not to disrupt its balance when the tank is full and during the jettisoning operation. It is known that the acceptable distance is determined by a mass and center of gravity diagram specific to each aircraft. According to one embodiment, the center of gravity of the tank alone filled with water is at an acceptable distance from the center of gravity of the aircraft. Each tube 12 is provided with a valve 13 at its connection to the tank. Each valve 13 is of the known type, for example of the butterfly type or one having a conical shut-off element, and will not be described further: it makes it possible to open and close the communication between the tank and each tube. As will be seen later on, one or more valves may also be positioned at the jettisoning device 14 to adapt the water flow rate. According to one embodiment, the system 8 comprises valves 13 at the connection between the tank and the tube and/or at the connection between the device 14 and the air outside the aircraft. Providing the tubes with valves 13 at their connection to the tank allows the aircraft to fly with the tank 10 filled with fluid and the tubes 12 empty. As a result, by positioning the tank at an acceptable distance from the center of gravity of the aircraft, the balance of the aircraft is maintained. However, it is possible to place the tank in a position further away from the center of gravity, for example to avoid the area into which the blades of the engine project. In this case, providing the jettisoning device with valves 13 makes it possible to fill the tubes (filled during flight) and to move the center of gravity of the system as a whole (relative to that of a system with empty tubes) in order that it is at an acceptable distance from that of the aircraft.

At least two conduits 22 extend in the longitudinal direction X between the tank 10 and the rear door 6 along said one or more tubes 12. In the case of cylindrical conduits 22 and tubes 12 of circular cross section, the conduits 22 have a smaller diameter than that of the tubes 12. One of the ends 24 of the conduits is connected to the tank 10 and the other end 26 is at the rear door 6. The conduits 22 at the end 26 extend in a direction different to the longitudinal direction which, in the embodiment illustrated, is a transverse direction. Specifically, the conduits 22 have a form that allows their end 26 to come transversely level with the lateral edge of the rear door or be set back in relation thereto towards the inside of the door, so as to be able to close the door 6 on takeoff, when landing and in certain flight phases. The conduits 22 make it possible to supply the tank 10 from the ground. Each end 26 is connected to one or more machines on the ground, for example fire engines, this making it possible to fill the tank with water from the ground. According to one possible embodiment, the end 26 is designed so as to receive the connection types of flexible hoses of the fire engines. The plurality of conduits makes it possible to adapt the filling time. Being accessible from both sides of the aircraft allows a machine on the ground to park on one side of the aircraft or the other, in the knowledge that it is also possible to have a machine on each side to speed up the filling operation. In the embodiment illustrated, three conduits 22 are provided along each of the two tubes 12, specifically six conduits in total. The two tubes 12 that are referred to as end tubes in the case of more than two tubes correspond to the tubes that are transversely closest to the walls of the aircraft. The conduits 22 are disposed on the side of each of the end tubes 12 on the opposite side to the adjacent tube. The conduits 22 are disposed one above another along the vertical axis Z. The conduits gradually get transversely further away from the tubes 12. In the embodiment illustrated, the conduits get further away until they are transversely at the edge of the rear door in a transverse direction Y. In the embodiment illustrated in FIG. 4, the end of the conduits 22 is in the second longitudinal half of the rear door 6 closest to the end 20.

The system 8 is provided with a means for warning persons filling the tank that it is full. Multiple embodiments are possible.

Figure 2:
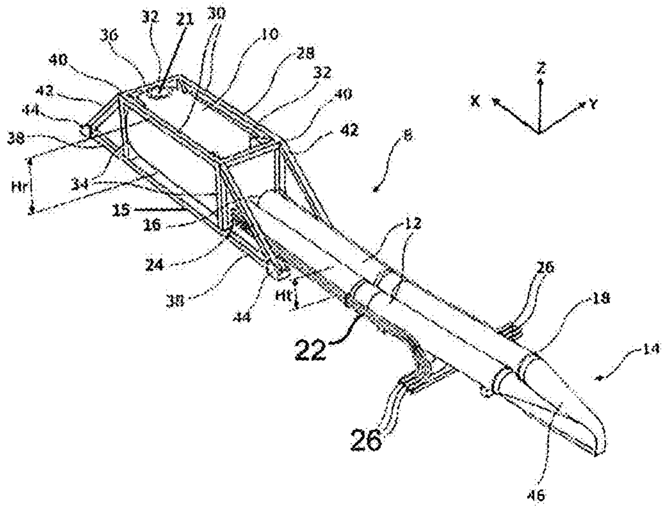
FIG. 2 is a perspective view of a fluid storing and jettisoning system according to the present invention.

According to the embodiment shown in FIG. 2, the tank 10 comprises an opening 21 and a float in the tank. Filling the tank causes the float to rise until it closes off the opening 21. A duct, which is not shown for the sake of simplicity, connects the top of the tank to one of the tubes 12. When the tank is closed off by the float, the water then passes through the duct and flows into the tube 12 in question. When the person in charge of filling the tank sees the water flow through the tube, they are warned that the tank is full.

According to another embodiment, which is not shown, a duct connects the tank by way of a lateral face thereof, preferably that where the tubes are connected, and one of the tubes 12. At the inlet of the duct at the tank, there is a flap which closes the opening and is supported by a valve spring, the force of which is greater than that exerted by the water. When the tank is full, the float closes the tank in the same way as before. The pressure rises and exceeds the maximum threshold established by the valve: the flap can no longer be kept closed. The flap opens and discharges the water into the tube 12. The person in charge of filling the tank, seeing the water flow through the tube 12, knows that the tank is full.

The system 8 comprises a transporting and fixing support 15 which, with the tank 10 and the one or more tubes 12, forms a one-piece assembly. The following description presents two embodiments of the support 15.

Figure 3:
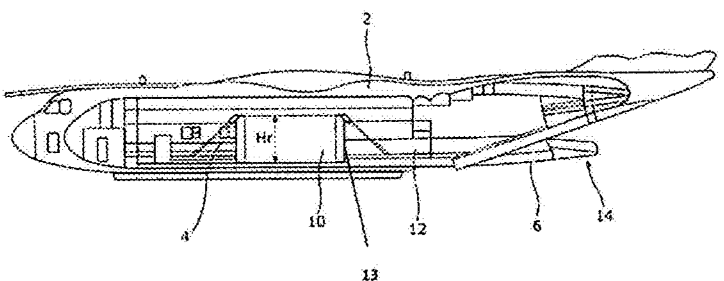
FIG. 3 is a lateral view of a host aircraft fitted with a fluid storing and jettisoning system according to the present invention, in which the inside of the aircraft is open schematically in a plane.

According to a first embodiment, the support 15 comprises a frame 28 having beams for transporting the tank and the one or more tubes and for fixing them in the aircraft, and for example to the floor 9 thereof. The frame 28, the tank 10 and the one or more tubes 12 form a one-piece assembly capable of being loaded into and unloaded from the aircraft. The beams have means for fixing to the aircraft and for example to the floor 9 of the aircraft that are of the known type. The figures illustrate one possible embodiment of the frame but any other embodiment which makes it possible to form a one-piece whole with the tank and the one or more tubes 12 in order to transport the one-piece system 8 into the aircraft or to unload it therefrom, and to fix it in the aircraft is possible. In the embodiment illustrated in FIGS. 2 and 3, the frame 28 comprises four longitudinal beams 30, four transverse beams 32 and four vertical beams 34 forming a parallelepipedal framework 36 of rectangular cross section. The tank 10 is in contact with all of the beams but does not protrude out of the framework 36 formed. The two lower longitudinal beams 30 are longitudinally continued on either side of the framework 36 by four lower longitudinal continuing beams 38. The upper ends 40 of each vertical beam 34 are connected to the ends 44 of the lower longitudinal continuing beams 38 by another inclined beam 42. The inclined beams 42 form supports for the framework 36 to increase its strength. Furthermore, the mass of the frame is distributed over a certain length of floor 9 in order to avoid local overloading and damage to the floor. The frame also makes it possible to keep the tank in position on the floor 9 of the aircraft. Lastly, it offers engagement points for any type of machine for transporting and introducing the modular system to the aircraft. The beams 42 located at the side of the tubes 12 frame them over some of their length and in particular in the area where the tubes 12 are connected to the tank. The beams can also be adapted to receive means for fixing the system 8 to the floor 9 of the aircraft.

According to a second embodiment, which is not illustrated, the support 15 has a pallet, on which at least the tank is disposed, for transporting the tank and the one or more tubes and for fixing them in the aircraft, and for example to the floor 9 thereof. The pallet, the tank 10 and the one or more tubes 12 form a one-piece assembly capable of being loaded into and unloaded from the aircraft. The pallet has means for fixing to the aircraft and for example to the floor 9 of the aircraft that are of the known type. All it is then necessary to do is carry the pallet into the aircraft and slide it on the floor 9 in order to position the system at the desired location, some floors being fitted with casters.

Irrespective of whether the embodiment has a pallet or a frame, the system 8 is a single piece forming a modular assembly which is capable of being integrated in a host aircraft. The modular system 8 presented can thus be installed temporarily in a host aircraft and makes it possible to avoid having to modify the aircraft to receive this system 8. The system 8 may be installed and uninstalled as desired depending on the program of the host aircraft in question. Furthermore, the support has a specific length for distributing the load of the tank over said length, as seen above for the illustrated example of the frame. According to one possible embodiment, the length of the support 15 (frame or pallet) is at least equal to the length of the tank 10.

The modular system 8 is fitted with a fluid jettisoning device 14, in the example described a water jettisoning device. The water jettisoning device 14 has a specific shape allowing the direction of flow to be modified. The device 14 allows the stream of water to flow from a longitudinal direction in a different direction. In the embodiment illustrated, the device 14 makes it possible to jettison the water in a suitable direction, for example perpendicular to the longitudinal direction, specifically a vertical direction Z, or approximately a vertical direction if the aircraft in flight is not in a horizontal position. Furthermore, the device 14 also has another advantage, which is to divide the fluid to be jettisoned into multiple streams, the use of which can be controlled independently for each of the streams, specifically permitted or not permitted. As a result, depending on the intensity of the fire, it would be possible to use only some of the streams, this making it possible to conserve an amount of water for another fire, another outbreak of fire, or for other purposes.

The water jettisoning device comprises a closed reservoir 46 having at least one opening 48 for the inlet of water and at least one opening 50 for jettisoning water out of the aircraft. The opening 48 has a shape that allows the reservoir to be fitted over the one or more tubes 12 so as to form a leak-tight connection in a known way. In the case of multiple parallel tubes, in the embodiment illustrated two tubes 12, the reservoir has two openings 48A, 48B that continue in the form of sleeves 52, 54 for connection to the tubes 12. In the present case, the sleeves 52, 54 have a cylindrical shape of circular cross section.

In the embodiment illustrated, the reservoir 46 comprises multiple independent openings 50A, 50B . . . 50*n*. The openings 50A, 50B . . . 50*n* abut one another. The openings 50A, 50B . . . 50*n* are contiguous such that they can all be circumscribed in one and the same larger opening 51 having a geometric shape determined by the shape of the openings 50A, 50B, . . . 50*n*. In the embodiment illustrated in the figures, each opening 50A, 50B . . . 50*n* has a rectangular shape. The contiguous openings 50A, 50B . . . 50*n* are circumscribed in one and the same large rectangular opening 51 divided into multiple openings 50A, 50B, . . . 50*n*. The openings 50A, 50B, . . . 50*n* are in a plane parallel to the plane XY, specifically a plane perpendicular to a plane YZ transverse to the tubes. The openings 50A, 50B, . . . 50*n* are oriented so as to guide the streams flowing through towards the ground, specifically in a vertical direction Z. In flight, the aircraft can fly in a nose-up position. The rear door 6 in the open position can be in the continuation of the floor 9 of the aircraft. As a result, the jettisoning device 14 disposed beyond the door 6 but in its longitudinal continuation is not in a horizontal position during flight. The plane in which the openings 50A, 50B . . . 50*n* are disposed is selected depending on the desired water jettisoning direction. The plane of the openings can be fixed (embodiment illustrated) or adjustable, individually or not individually, or with the choice of being able to adjust them individually or not. Furthermore, the reservoir has a shape that makes it possible to form water flow ducts 53A, 53B, . . . 53*n* of which the outlet orifice corresponds to each opening 50A, 50B . . . 50*n*. In this instance, the ducts have a parallelepipedal shape of rectangular cross section and together form a parallelepipedal block of rectangular cross section of which the outlet orifice corresponds to the rectangular opening 51. The outer contours of the ducts could be rounded for aerodynamic purposes. The axis of each duct 53A, 53B, . . . 53*n* corresponds to the axis of the corresponding opening 50A, 50B . . . 50*n*.

According to one embodiment, the openings 50A, 50B . . . 50*n* are each able to be closed off by a valve 55 taking the form of a flap 56A, 56B, . . . 56*n*, respectively, in the embodiment illustrated. According to one embodiment of the invention, each duct 53A, 53B, . . . 53*n* is provided with a flap 56A, 56B, . . . 56*n*. As a result, the opening and closing of each flap 56A, 56B, . . . 56*n* can be controlled independently for each flap or not by a control device 58 described later on. The flaps 56 make it possible to adjust the flow rate of jettisoned fluid.

In the embodiment illustrated, the reservoir 46 takes the form of a funnel, specifically having dimensions in a plane parallel to the plane XY that decrease vertically downwards, the largest dimension being level with the tubes so as to guide the water towards the one or more openings 50. In the embodiment illustrated, the lowest part of the reservoir is at the dimensions of the opening 51. The flaps 56 each take the form of a flat panel 60 which is articulated about an axis parallel to the direction Y; the axis of articulation is longitudinally in the center for each panel. In the open position, the panels 60 are each in a plane parallel to the plane YZ and are all parallel to one another. In the closed position, the panels are in a plane parallel to the plane XY, are contiguous, and abut one another without being superposed, each of the panels closing off the corresponding opening 50A, 50B, . . . 50*n* and closing the abovementioned rectangular opening 51. Any other embodiment is possible.

In the embodiment illustrated, the reservoir 46 has a dimension in a plane parallel to the plane YZ that decreases longitudinally in the direction away from the openings 48. Any other shape of the reservoir is possible provided that it has inlet openings 48 and outlet opening 50 for changing the direction of the stream so as to jettison the water in the direction of the fire and thus reduce its dispersion.

Figure 10:
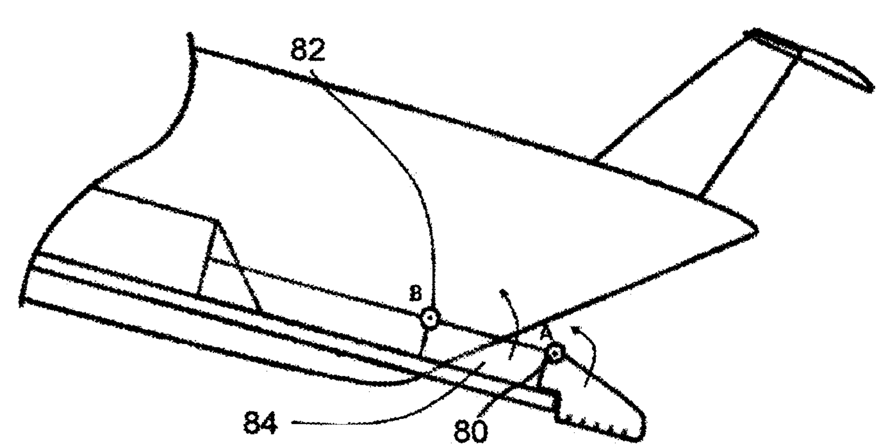
FIG. 10 is a partial lateral schematic view of the rear of the aircraft in a first position of the system when the jettisoning device is deployed; and, FIG. 11 is a partial lateral schematic view of the rear of the aircraft in a second position of the system when the jettisoning device is retracted.
Figure 11:
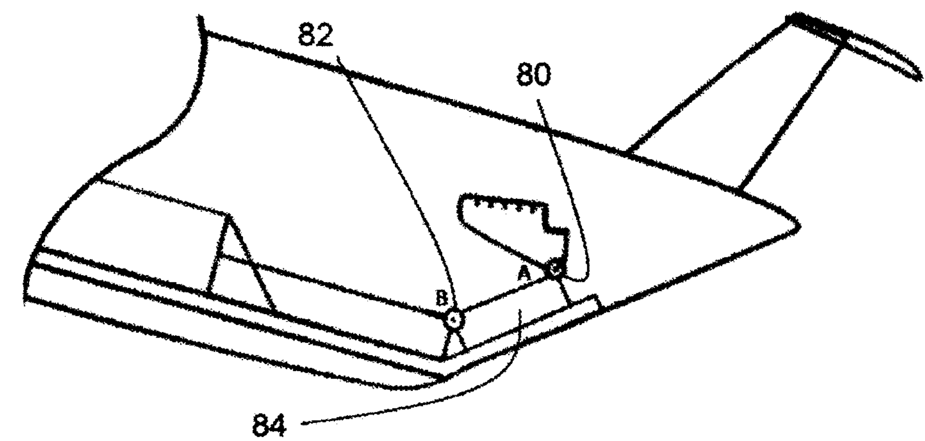

According to one possible embodiment, the jettisoning device 14 can be retracted. This is because, to allow the rear door 6 to be closed, it is necessary that the device 14 does not protrude beyond the end 20 of the rear door. Numerous embodiments are possible. According to a first possible embodiment which can be seen in FIG. 10, the jettisoning device is connected to the tube or to said tubes 12 via a hinge 80 disposed at the uppermost point of each of the tubes 12 and sleeves 52, 54 that allow the device to pivot about a transverse axis A parallel to the direction Y. A peripheral seal is provided between the one or more tubes 12 and the one or more sleeves 52, 54 to ensure leak-tightness when the one or more sleeves are in the jettisoning position in the continuation of the one or more tubes 12. As shown in FIGS. 10 and 11, it is possible to provide a second hinge 82 of the same type as the hinge 80 that is positioned further upstream at the tubes 12 and the conduits 22. The second hinge allows a segment 84 of tubes that adjoins the jettisoning device to pivot in rotation about a transverse axis B parallel to the direction Y, also causing the jettisoning device to rotate so as to allow the rear door 6 to be closed easily. Thus, from the deployed position on the FIG. 10, first of all the jettisoning device is pivoted about the axis A and then a segment of tubes is pivoted about the axis B and the module is thus completely retracted inside the aircraft and the rear door can be closed. It is also possible to provide a determined sequence of movements allowing the jettisoning device to retract and the door to close. A hinge is also provided at the conduits 22 to follow the rotational movement with the segment 84 of tubes. According to another possible embodiment, at least one part of the one or more tubes is telescopic so as to be able to reduce the length and enable the jettisoning device 14 to no longer protrude beyond the end 20.

According to another embodiment, the jettisoning device 14 cannot be retracted. This is because certain host aircraft can fly with the rear door 6 open.

Figure 7:
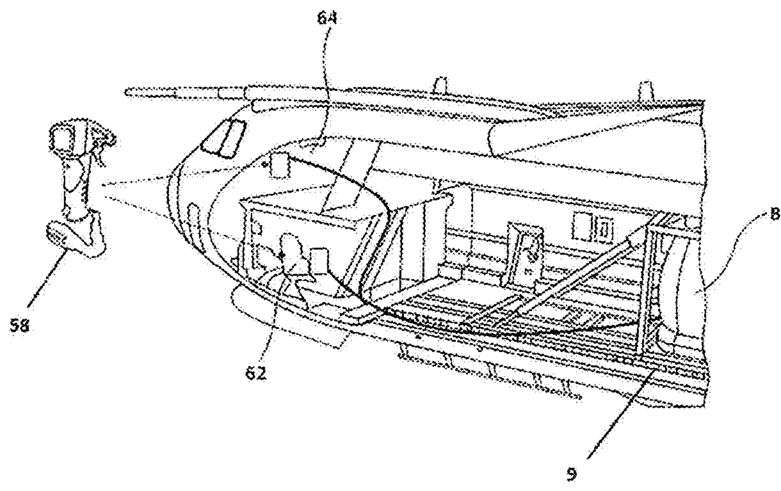
FIG. 7 is a perspective view from a certain lateral angle of the front area of an aircraft fitted with a fluid storing and jettisoning system according to the present invention, the inside of which is open to schematically show a control device of said system.

As indicated above, the system 8 is controlled using a control device 58 which is able to be manipulated directly by a pilot and/or a co-pilot and/or a third person in the cockpit and/or any other operator, the function of the control device being to trigger the jettisoning of water and/or to prepare the amount that is suitable. The control could also be envisaged as being done from the ground, in that case the control device being connected to the aircraft by any type of known wireless communication means. The device 58, represented by a rectangle in the aircraft in the example illustrated in FIG. 7, is connected to the system 8 to control it. According to the embodiment described above, the device 58 is connected to the valves 13 for closing the tubes 12 at the side of the tank and/or to the valves 55, specifically in this case to the closing flaps 56. The device may be used by a third person 62 (only the seat of whom, on which they are to sit, is shown) or from the cockpit 64 on the basis of the choice made by the pilot and/or the third person. The following description presents one possible embodiment of the control device, but any other embodiment is possible.

Figure 8:
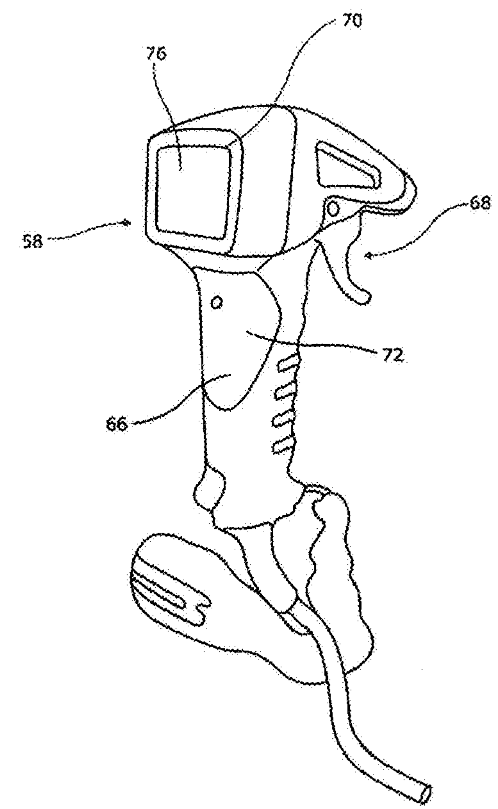
FIG. 8 is a perspective view of the control device per se according to the present invention.
Figure 9:
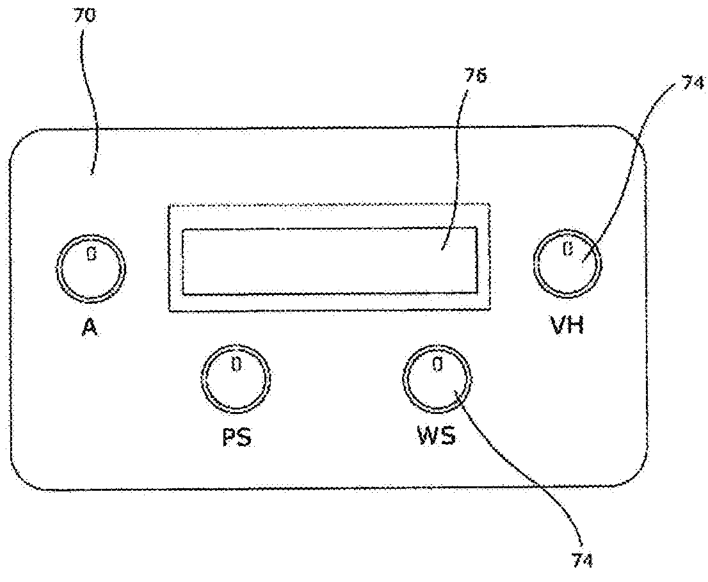
FIG. 9 is a view in a plane of the control panel of the control device according to the present invention.

As shown in FIG. 8, the control device 58 takes the form of a gun 66 having a trigger 68, a control panel 70 and a grip handle 72. The control panel 70 has means for parametrizing multiple criteria that have an influence on the amount of water that needs to be jettisoned. As a result, it is possible to control the amount of water using the valves 13 and/or 55 presented above, depending on various criteria. The gun 66 comprises an internal processor which contains an algorithm program for determining the amount of water and more specifically the stream required and the period of time depending on the criteria input. In the embodiment illustrated, shown in FIG. 9, the control panel 70 comprises thumbwheel switches 74 for incrementally adjusting each criterion. Each switch 74 makes it possible to adjust one criterion. In the example illustrated, it is possible to input four criteria:—the jettisoning altitude (A) of the aircraft;—the speed (PS) of the aircraft;—the wind speed (WS);—the soil in question (VH) and for example the height and/or the type of vegetation and/or the type of soil. Depending on whether for example the forest is coniferous or deciduous, the amount of water required is not necessarily the same. Peat soils and bituminous soils should not be considered in the same way. Other criteria are able to be added via such a control panel and/or in a different way. For example, the rate of jettisoning can vary depending on the soil above which the aircraft is flying. In this case, the soil in question is no longer input using a switch but using a card on which the soil over which the aircraft is flying is stored. Thus, for example, the flow rate may be high if the height of vegetation is significant and then reduced or even interrupted in the presence of a clearing. It is possible to program only certain criteria or all of them. The control panel 70 has a display screen 76 for displaying information. Thus, for example, when the altitude switch is manipulated, the altitude selected is displayed on the screen 76. Other types of display can be used, such as for example single light-emitting diodes (LEDs) or lines of light-emitting diodes. Once all of the criteria have been determined and input, the algorithm calculates the amount of water required and the corresponding valves 13 and/or 55 that are to be opened for a given period of time. When the aircraft arrives at the locations, all that remains is for the person designated to actuate the jettisoning of water to actuate the trigger 68; the valves 13, 55 commanded by the trigger, specifically the valves 13 for closing the tubes 12 at the side of the tank 10 and/or the valves 55 (flaps 56) that are required open and the amount of water calculated will be sprayed for the determined period of time over the fire that is to be extinguished.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fluid storing and jettisoning system introduced into an internal area of an aircraft, and the fluid storing and jettisoning system comprising:

a fluid tank, a tube connected to the fluid tank, a jettisoning device located at an end of the tube and comprising: a closed tank and multiple independent and contiguous openings, the closed tank having an opening connected in leak-tight fashion to the tube for entry of a fluid, and the multiple independent and contiguous openings being circumscribed in a single opening with a given geometric shape and being oriented to jettison the fluid in a determined direction which is different from a longitudinal direction of flow of the fluid in the tube, wherein a hinge is provided to allow the jettisoning device to pivot in rotation about a transverse axis A, wherein a second hinge is provided at the tube to allow a segment of the tube that adjoins the jettisoning device to pivot in rotation about a transverse axis B, wherein the hinge and the second hinge are located above the tube, wherein the jettisoning device is retractable, wherein the multiple independent and contiguous openings together form a rectangle, and wherein the determined direction in which the fluid is jettisoned via the multiple independent and contiguous openings is vertical and perpendicular to the longitudinal direction of flow of the fluid in the tube.

2. The fluid storing and jettisoning system according to claim 1, wherein each of the multiple independent and contiguous openings is shut off by at least one valve, an opening and a closing of the at least one valve for each of the multiple independent and contiguous openings being controlled independently by a control device.

3. The fluid storing and jettisoning system according to claim 1, wherein the closed tank comprises a funnel shape.

4. The fluid storing and jettisoning system according to claim 3, wherein the funnel shape has a cross section in a plane parallel to a horizontal plane XY that narrows longitudinal downwards.

5. The fluid storing and jettisoning system according to claim 1, wherein the aircraft comprising: a rear door configured to be moved between a closed position and an open position for communication between an outside of the aircraft and the internal area of the aircraft, and, wherein the multiple independent and contiguous openings project completely beyond the rear door of the aircraft in a jettisoning position.

6. A fluid storing and jettisoning system introduced into an internal area of an aircraft, and the fluid storing and jettisoning system comprising:

a fluid tank, a tube connected to the fluid tank, a jettisoning device located at an end of the tube and comprising: a closed tank and multiple independent and contiguous openings, the closed tank having an opening connected in leak-tight fashion to the tube for entry of a fluid, and the multiple independent and contiguous openings being circumscribed in a single opening with a given geometric shape and being oriented to jettison the fluid in a determined direction which is different from a longitudinal direction of flow of the fluid in the tube, wherein a hinge is provided to allow the jettisoning device to pivot in rotation about a transverse axis A, wherein a second hinge is provided at the tube to allow a segment of the tube that adjoins the jettisoning device to pivot in rotation about a transverse axis B, wherein each of the multiple independent and contiguous openings is shut off by at least one valve, an opening and a closing of the at least one valve for each of the multiple independent and contiguous openings being controlled independently by a control device, wherein the jettisoning device is retractable, and, wherein the determined direction in which the fluid is jettisoned via the multiple independent and contiguous openings is vertical and perpendicular to the longitudinal direction of flow of the fluid in the tube.

* * * * *